US012684605B2

(12) United States Patent
Li et al.

(10) Patent No.: US 12,684,605 B2
(45) Date of Patent: Jul. 14, 2026

(54) COMMUNICATION OF STATE SWITCHING INFORMATION

(71) Applicant: BEIJING XIAOMI MOBILE SOFTWARE CO., LTD., Beijing (CN)

(72) Inventors: Yanhua Li, Beijing (CN); Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 409 days.

(21) Appl. No.: 18/275,366

(22) PCT Filed: Feb. 1, 2021

(86) PCT No.: PCT/CN2021/074730
§ 371 (c)(1),
(2) Date: Aug. 1, 2023

(87) PCT Pub. No.: WO2022/160354
PCT Pub. Date: Aug. 4, 2022

(65) Prior Publication Data
US 2024/0098768 A1     Mar. 21, 2024

(51) Int. Cl.
*H04W 72/53*        (2023.01)
*H04L 5/00*         (2006.01)
(Continued)

(52) U.S. Cl.
CPC ........... *H04W 72/53* (2023.01); *H04L 5/0048* (2013.01); *H04L 5/005* (2013.01); *H04L 5/0053* (2013.01);
(Continued)

(58) Field of Classification Search
CPC ..... H04W 72/53; H04W 72/23; H04W 72/04; H04W 76/27; H04L 5/0092; H04L 5/005; H04L 5/0048; H04L 5/0053
See application file for complete search history.

(56) References Cited

U.S. PATENT DOCUMENTS

2020/0204323 A1*    6/2020   Kim ...................... H04L 5/0048

FOREIGN PATENT DOCUMENTS

| CN | 110035503 A | 7/2019 |
| CN | 110167163 A | 8/2019 |

(Continued)

OTHER PUBLICATIONS

European Patent Application No. 21921954.0, Search and Opinion dated Feb. 26, 2024, 10 pages.

(Continued)

*Primary Examiner* — Omar J Ghowrwal
(74) *Attorney, Agent, or Firm* — Cozen O'Connor

(57) ABSTRACT

A method for information transmission performed by a based station includes: sending second indication information, wherein the second indication information is configured to indicate to switch a state of resource configuration information of a reference signal. An initial state of resource configuration information comprises: an available state and an unavailable state. The initial state is specified in a communication protocol; and the state of the resource configuration information is able to be switched from the unavailable state to the available state, or from the available state to the unavailable state.

13 Claims, 5 Drawing Sheets

(51) Int. Cl.
| | |
|---|---|
| *H04W 72/04* | (2023.01) |
| *H04W 72/23* | (2023.01) |
| *H04W 76/27* | (2018.01) |

(52) U.S. Cl.
CPC .......... *H04L 5/0092* (2013.01); *H04W 72/23* (2023.01); *H04W 76/27* (2018.02); *H04W 72/04* (2013.01); *Y02D 30/70* (2020.08)

(56)     References Cited

FOREIGN PATENT DOCUMENTS

| | | |
|---|---|---|
| CN | 111585724 A | 8/2020 |
| EP | 3723445 A | 10/2020 |
| WO | WO 2019190245 A1 | 10/2019 |

OTHER PUBLICATIONS

Xiaomi Communications, "Discussion on TRS CSI-RS for RRC-IDLE and RRC-Inactive State UE", 3GPP TSG-RAN WG2 Meeting #112 electronic, R2-2008946, Nov. 2020, 6 pages.
Chinese patent application No. 202180000357.8, Office Action dated Oct. 19, 2024, 5 pages.
Chinese patent application No. 202180000357.8, English translation of Office Action dated Oct. 19, 2024, 8 pages.
PCT/CN2021/074730, International Search Report dated Nov. 8, 2021, 2 pages.

* cited by examiner

| UE | | Base station |

Wireless communication

201: sending first indication information, wherein the first indication information is configured to indicate an initial state of resource configuration information of a reference signal, and the resource configuration information is configured to indicate at least transmission resources of the reference signal

COMMUNICATION OF STATE SWITCHING INFORMATION

CROSS-REFERENCE TO RELATED APPLICATION

This application is the U.S. national application of International Application No. PCT/CN2021/074730, filed on Feb. 1, 2021, the entire contents of which are incorporated herein by reference.

TECHNICAL FIELD

The disclosure relates to a field of wireless communication technologies, but is not limited to the field of wireless communication technologies, in particular to a method for information transmission, and a communication device.

BACKGROUND

In the related art, it is proposed that in an idle state, an additional tracking reference signal (TRS) or channel state information reference signal (CSI-RS) is used to assist a user in obtaining and network time-frequency domain synchronization. Compared with the existing synchronization broadcast block, SS/PBCH block (SSB), TRS or CSI-RS may be configured closer to a paging occasion (PO), while the existing SSB is farther away from the PO. When the SSB is used for synchronization, a user equipment (UE) needs to wake up in advance for a long time and to synchronize with the SSB. However, when TRS/CSI-RS is used for synchronization, the UE may wake up later, which may thus save more power.

SUMMARY

According to a first aspect of the present disclosure, there is provided a method for information transmission, which is applied to a base station. The method includes: sending second indication information, in which the second indication information is configured to indicate to switch a state of resource configuration information of a reference signal. An initial state of resource configuration information comprises: an available state and an unavailable state. The initial state is specified in a communication protocol; and the state of the resource configuration information is able to be switched from the unavailable state to the available state, or from the available state to the unavailable state.

According to a second aspect of the disclosure, there is provided a method for determining transmission resources, which is applied to a user equipment (UE). The method includes: receiving second indication information, in which the second indication information is configured to indicate to switch a state of resource configuration information of a reference signal. An initial state of resource configuration information comprises: an available state and an unavailable state. The initial state is specified in a communication protocol; and the state of the resource configuration information is able to be switched from the unavailable state to the available state, or from the available state to the unavailable state.

According to a third aspect of the present disclosure, there is provided a user equipment (UE), including: a processor and, a memory storing programs executable by the processor. When the programs are executed by the processor, the processor is configured to receive second indication information, wherein the second indication information is configured to indicate to switch a state of resource configuration information of a reference signal. An initial state of resource configuration information comprises: an available state and an unavailable state. The initial state is specified in a communication protocol; and the state of the resource configuration information is able to be switched from the unavailable state to the available state, or from the available state to the unavailable state.

It should be understood that both the foregoing general description and the following detailed description are exemplary and explanatory only, which are not intended to limit the embodiments of the present disclosure.

BRIEF DESCRIPTION OF THE DRAWINGS

The accompanying drawings, which are incorporated in and constitute a part of this specification, illustrate embodiments consistent with the present disclosure and together with the description serve to explain principles of the embodiments of the present disclosure.

DETAILED DESCRIPTION

Embodiments may be described in detail herein, examples of which are illustrated in the accompanying drawings. Where the following description refers to the drawings, the same numerals in different drawings refer to the same or similar elements unless otherwise indicated. The implementations described in the following embodiments do not represent all implementations consistent with the embodiments of the disclosure. Rather, they are merely examples of apparatuses and methods consistent with some aspects of the embodiments of the disclosure, as recited in the appended claims.

Terms used in the embodiments of the disclosure are only for the purpose of describing specific embodiments, but not intended to limit the embodiments of the disclosure. As used in the embodiments of the disclosure and the appended claims, the singular forms "a/an", "the" and "said" are also intended to include the plural unless the context clearly dictates otherwise. It should also be understood that the term "and/or" as used herein refers to and includes any and all possible combinations of one or more of the associated listed items.

It should be understood that, although the embodiments of the disclosure may use the terms first, second, third, etc. to describe various information, such information should not be limited to these terms. These terms are only used to distinguish information of the same type from one another. For example, without departing from the scope of the embodiments of the disclosure, first information may also be called second information, and similarly, second information may also be called first information. Depending on the context, the words "if" and "in case that" as used herein may be interpreted as "upon" or "when" or "in response to determining".

Figure 1:
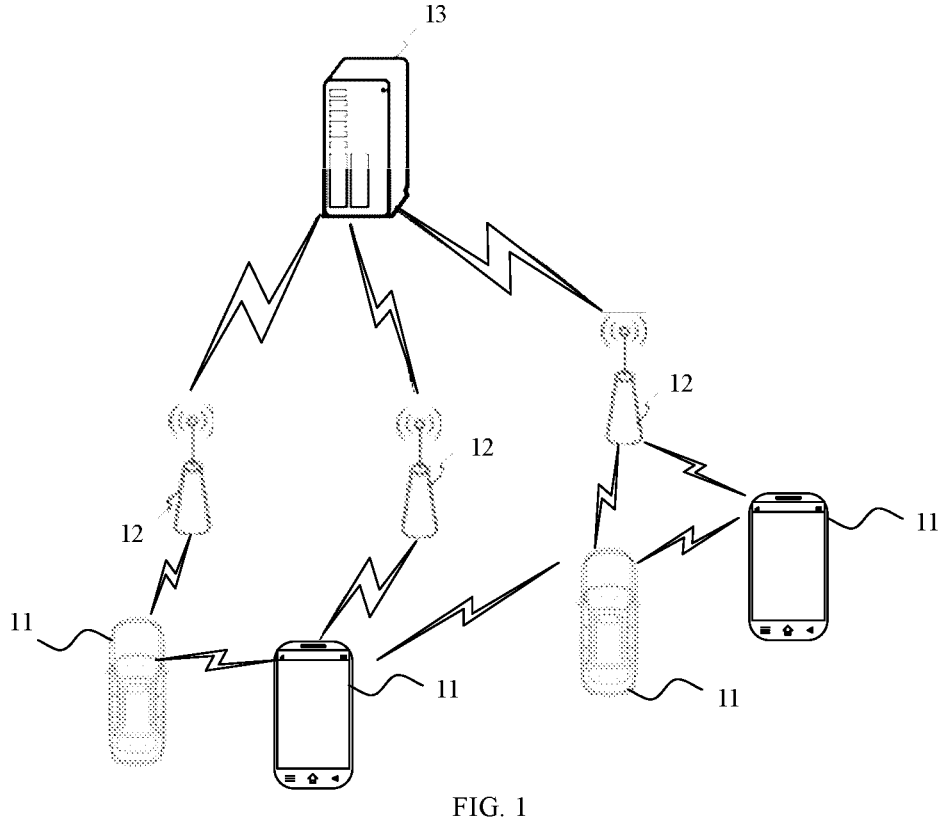
FIG. 1 is a structural diagram illustrating a wireless communication system according to an embodiment.

Referring to FIG. 1, it is a structural diagram illustrating a wireless communication system according to an embodiment. As shown in FIG. 1 the wireless communication system is a communication system based on cellular mobile communication technology, and the wireless communication system may include: several terminals 11 and several base stations 12.

The terminal 11 may be a device that provides voice and/or data connectivity to a user. The terminal 11 may communicate with one or more core networks via a radio access network (RAN), and the terminal 11 may be an Internet of Things terminal, such as a sensor device, a mobile phone (or called a "cellular" phone) and a computer having an IoT terminal. For example, the terminal 11 may be a fixed, portable, pocket, hand-held, built-in computer or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device connected externally to the trip computer. Alternatively, the terminal 11 may also be a roadside device, for example, it may be a street lamp, a signal lamp, or other roadside devices with a wireless communication function.

The base station 12 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be a next-generation system of the 5G. The access network in the 5G system may be called a new generation-radio access network (NG-RAN). Alternatively, the wireless communication system may be a machine type communication (MTC) system.

The base station 12 may be an evolved base station (eNB) used in the 4G system. Alternatively, the base station 12 may also be a base station (gNB) that adopts a centralized distributed architecture in a 5G system. When the base station 12 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 12 is not limited in this embodiment of the disclosure.

A wireless connection may be established between the base station 12 and the terminal 11 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the terminals 11, for example, vehicle-to-vehicle (V2V) communication, vehicle to infrastructure (V2I) communication and vehicle to pedestrian (V2P) communication and other communication scenes in vehicle-to-everything (V2X) communication.

In some embodiments, the above wireless communication system may further include a network management device 13.

Several base stations 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 13 is not limited in this embodiment of the disclosure.

The execution body involved in the embodiments of the disclosure include, but are not limited to: a UE such as a mobile phone terminal supporting cellular mobile communication, and a base station.

An application scenario of the embodiments of the disclosure is that, the inconsistency between the base station and the UE in understanding information associated with the TRS/CSI-RS may cause a major problem. For example, if the network side sends a valid/effective TRS/CSI-RS, but the UE thinks there is no such valid/effective TRS/CSI-RS and may use the existing SSB synchronous way, thus causing a large power consumption. On the contrary, if the network side stops sending the valid TRS/CRS, and the UE still synchronizes with TRS/CRS according to the previous understanding, the synchronization accuracy may be reduced. The network side may be configured with resource configuration of the TRS/CSI-RS, and may decide whether to make the resource configuration effective. It is an urgent problem to be solved how to make the understandings from both the network side and the UE consistent about making the resource configuration of the TRS/CSI-RS effective.

Figure 2:
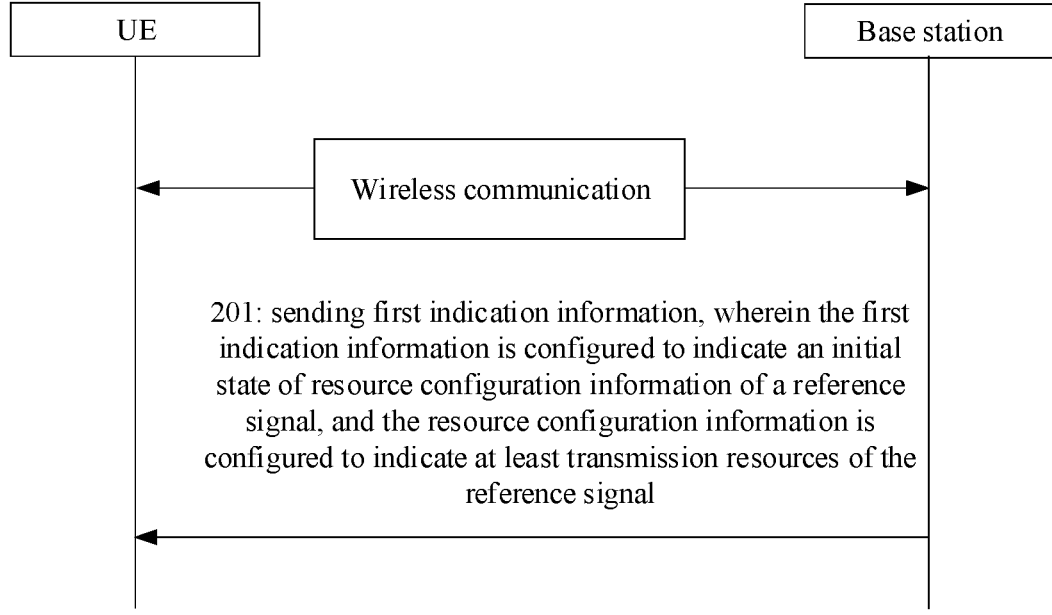
FIG. 2 is a flowchart illustrating a method for information transmission applicable to a base station according to an embodiment.

As shown in FIG. 2, the embodiment provides a method for information transmission, which may be applied to a base station. The method includes the following step.

At step 201, first indication information is sent. The first indication information is configured to indicate an initial state of resource configuration information of a reference signal, and the resource configuration information is configured to indicate at least transmission resources of the reference signal.

The base station may be configured with resource configuration information for indicating at least transmission resources of the reference signal. The base station may send the resource configuration information to the UE in the form of broadcast or unicast. The UE may determine at least transmission resources of the reference signal based on the resource configuration information. The UE may be in an inactive state or an idle state, etc.

Here, the reference signal may include but not limited to a signal for the UE to perform time domain and/or frequency domain synchronization. The UE may receive the reference signal based on the transmission resources indicated by the resource configuration information, and achieve synchronization. The transmission resources indicated by the resource configuration information include but not limited to frequency domain resources, time domain resources and/or code domain resources.

The base station may make effective settings for the resource configuration information. For example, the resource configuration information may be set to be in an activated state or a deactivated state. The resource configuration information is in the activated state, which means that the transmission resources configured by the resource configuration information are reasonable, and the base station is actually sending a reference signal corresponding to the transmission resources. At this time, it is available to the UE, and the network side expects the UE to use. The resource configuration information is in the deactivated state, which means that the transmission resources configured by the resource configuration information may be unreasonable, or the transmission resources configured by the resource configuration information may be reasonable, but the network side does not use the transmission resources to send the reference signal. When the resource configuration information is in the deactivated state, the reference signal sent by using the transmission resources is available for the UE, and the network side expects the UE to use it.

The initial state of the resource configuration information may be an initial effective state set by the base station for the resource configuration information. The initial state may be a default state set by the base station for the resource configuration information, or a state of the resource configuration information set by the base station for the initially accessed UE, and the like.

The base station may send the first indication information to the UE in the form of broadcast or unicast. After receiving the first indication information, the UE may determine the initial state of the resource configuration information.

In this way, the base station explicitly indicates the initial state of the resource configuration information through the first indication information, and the UE determines the initial state of the resource configuration information based on the first indication information, so that the base station and the UE reach a consensus on understanding the state of the resource configuration information, avoiding a situation where the UE cannot accurately receive the reference signal due to the inconsistency between the base station and the UE in understanding the state of the resource configuration information.

In an embodiment, sending the first indication information includes:

sending a radio resource control (RRC) message carrying the second indication information;

sending a system message carrying the first indication information; or sending a downlink control information (DCI) message carrying the second indication information.

The base station informs the UE of the initial state of the resource configuration information of the reference signal by broadcasting a system message or a dedicated signaling that carries the first indication information, such as an RRC message or a DCI message.

In an example, the first indication information may be carried in an RRC release message.

In this way, the amount of information carried in the system message or the dedicated signaling, such as the RRC message or the DCI message, may be increased and the transmission efficiency may be thus improved.

In an embodiment, the reference signal includes at least one of: a channel state information reference signal (CSI- RS); a synchronization signal and physical broadcast channel block (SSB); or a tracking reference signal (TRS)

The initial state of resource configuration information may be the initial state of resource configuration information of CSI-RS, and/or TRS, and/or SSB.

The UE may determine the initial state of the resource configuration information of the CSI-RS, and/or the TRS, and/or the SSB based on the first indication information. Then it is determined whether synchronization may be performed based on the CSI-RS, and/or TRS, and/or SSB.

In an example, in response to the initial state of the resource configuration information of the CSI-RS and/or TRS being in an activated state, the CSI-RS and/or TRS may be received on the transmission resources indicated by the resource configuration information, and the CSI-RS and/or TRS may be used for synchronization. In response to the initial state of the resource configuration information of the CSI-RS and/or TRS being in a deactivated state, the SSB may be used for synchronization.

In this way, on the one hand, a situation is reduced where due to the inconsistency between the base station and the UE in understanding the resource configuration information, the UE uses CSI-RS and/or TRS for synchronization when the resource configuration information is in the deactivated state, resulting in a decrease in the synchronization accuracy; on the other hand, a situation is reduced where due to the inconsistency between the base station and the UE in understanding the resource configuration information, the UE uses the SSB for synchronization when the resource configuration information is in the activated state, resulting in an increase in power consumption.

In an embodiment, the initial state of the resource configuration information includes one of: a fixed activated state, a variable activated state, or a variable deactivated state.

In response to the resource configuration information being in a fixed activated state, the state of the resource configuration information cannot be changed, i.e., being in a continuous activated state. The base station may not change the state of the resource configuration information, and may not send information associated with changing the state of the resource configuration information to indicate a change in the state of the resource configuration information.

In response to the resource configuration information being in a fixed activated state, the UE receives the reference signal based on the transmission resources indicated by the resource configuration information, and the UE may not continue to monitor the information associated with changing the state of the resource configuration information. It is always determined that the resource configuration information is in the activated state.

In response to the resource configuration information being in a variable activated state, the state of the resource configuration information may change. The base station may change the state of the resource configuration information, and send information associated with changing the state of the resource configuration information to indicate a change in the state of the resource configuration information. For example, the base station may adjust the resource configuration information to be in a variable deactivated state, and send information associated with changing the state of the resource configuration information to indicate that the state of the resource configuration information is changed to the deactivated state.

In response to the resource configuration information being in a variable deactivated state, the state of the resource configuration information may change. The base station may change the state of the resource configuration information, and send information associated with changing the state of the resource configuration information to indicate a change in the state of the resource configuration information. For example, the base station may adjust the resource configuration information to be in a variable activated state, and send information associated with changing the state of the resource configuration information to indicate that the state of the resource configuration information is changed to the activated state.

In response to the resource configuration information being in a variable activated state or a variable deactivated state, the UE determines whether to receive the reference signal based on the indication of the resource configuration information and the UE may continue to monitor the information associated with changing the state of the resource configuration information.

In this way, different initial states are indicated through the first indication information, thus improving the flexibility of indicating the resource configuration information.

In an embodiment, in response to the first indication information indicating that the resource configuration information is in the fixed activated state, the method further includes: in response to the UE switching from a first RRC state to a second RRC state, reconfiguring the resource configuration information.

Here, reconfiguring the resource configuration information is that, the resource configuration information is activated while reconfiguring.

After sending the first indication information, the UE knows that the resource configuration information is in the fixed activated state. At this time, the base station may configure and activate resource configuration information at the same time. The first indication information may be carried in a downlink message and sent to the UE. For example, the first indication information may be carried in an RRC message and sent to the UE. In response to the first indication information indicating that the resource configuration information is in the fixed activated state, then the base station and the UE determine that the resource configuration information is in the fixed activated state, and the base station does not need to send other information to indicate a change in the state of the resource configuration information.

After receiving the first indication information indicating the fixed activated state, the UE may no longer monitor the second indication information, that is, no longer monitor indication information indicating a change in the state of the resource configuration information.

For UEs in different RRC states, the base station may configure different transmission resources of reference signals. Therefore, when the RRC state of the UE changes, the base station may reconfigure different transmission resources for the UE. Here, the first RRC state is different from the second RRC state. The first RRC state may be an RRC inactive state or an RRC idle state. The second RRC state may be an RRC idle state or an RRC inactive state.

In an embodiment, in response to the first indication information indicating that the resource configuration information is in the fixed activated state, the transmission resources of the reference signal indicated by the resource configuration information is periodic transmission resources.

In response to the first indication information indicating that the resource configuration information is in the fixed activated state, the transmission resources of the reference signal may be the periodic transmission resources. For example, the transmission resources of the reference signal may be transmission resources spaced by a predetermined number of DRX cycles. In an embodiment, the UE determines that the resource configuration information is in the activated state only within a paging time window (PTW window) in the scenario of configuring eDRX.

In an embodiment, in response to the first indication information indicating that the resource configuration information is in the variable activated state, the method further includes: sending second indication information, in which the second indication information is configured to indicate the resource configuration information to switch from the variable activated state to the variable deactivated state; or
  in response to the first indication information indicating that the resource configuration information is in the variable deactivated state, the method further includes: sending second indication information, in which the second indication information is configured to indicate the resource configuration information to switch from the variable deactivated state to the variable activated state.

The second indication information may be a switch signal, indicating that the resource configuration information is switched between two or more states. For example, the second indication information may be a signal indicating that the resource configuration information is switched between a variable deactivated state and a variable activated state. If the UE currently determines that the resource configuration information is in a variable deactivated state and the second indication information is received, then the UE determines that the resource configuration information is in a variable activated state. If the UE currently determines that the resource configuration information is in a variable activated state and the second indication information is received, then the UE determines that the resource configuration information is in a variable deactivated state.

The second indication information may also directly indicate a state of the resource configuration information to be changed. For example, the second indication information may directly indicate to change the state of the resource configuration information to a variable deactivated state, or the second indication information may directly indicate to change the state of the resource configuration information to a variable activated state.

In this way, the state change of the resource configuration information is indicated by the second indication information, so that the base station may inform the UE when the state of the resource configuration information is changed, so that the understandings of the resource configuration information by the base station and the UE are consistent.

In response to the second indication information indicating the resource configuration information to switch from the variable activated state to the variable deactivated state, a duration for which the resource configuration information remains in the deactivated state may be an infinite time. The base station may reactivate the resource configuration information, and send to the UE again second indication information for indicating the resource configuration information to switch from the variable deactivated state to the variable activated state.

In response to the second indication information indicating the resource configuration information to switch from the variable deactivated state to the variable deactivated state, a duration for which the resource configuration information remains in the activated state may be an infinite time. The base station may deactivate the resource configuration information again, and send to the UE again second indication information for indicating the resource configuration information to switch from the variable activated state to the variable deactivated state.

The UE may determine that the resource configuration information is in the variable activated state or the variable deactivated state based on an indication of the second indication information.

In an embodiment, in response to the second indication information being configured to indicate the resource configuration information to switch from the variable activated state to the variable deactivated state, the method further includes: maintaining the resource configuration information in the variable deactivated state within a first validity duration; or In response to the second indication information being configured to indicate the resource configuration information to switch from the variable deactivated state to the variable activated state, the method further includes: maintaining the resource configuration information in the variable activated state within a second validity duration.

In response to the second indication information indicating the resource configuration information to switch from the variable activated state to the variable deactivated state, the duration for which the resource configuration information remains in the deactivated state may be the first validity duration. After the first validity duration ends, the base station may reactivate the resource configuration information.

The UE may determine that within the first validity duration, the resource configuration information is in the deactivated state, and outside the first validity duration, the resource configuration information is in the activated state.

In response to the second indication information indicating the resource configuration information to switch from the variable deactivated state to the variable activated state, the duration for which the resource configuration information remains in the activated state may be the second validity duration. After the second validity duration ends, the base station may deactivate the resource configuration information again.

The UE may determine that within the second validity duration, the resource configuration information is in the activated state, and outside the second validity duration, the resource configuration information is in the deactivated state.

In an embodiment, the first validity duration or the second validity duration is pre-configured by a network side; or the first validity duration or the second validity duration is specified in a communication protocol.

Here, the first validity duration may be pre-configured by a core network or the like, or may be specified in a communication protocol.

Here, the second validity duration may be pre-configured by the core network or the like, or may be specified in a communication protocol.

In an embodiment, the first validity duration or the second validity duration is continuous in a time domain; or the first validity duration or the second validity duration includes at least two sub-validity durations that are discontinuous in a time domain.

The first validity duration may be a continuous duration in the time domain. The resource configuration information may remain in the variable deactivated state for a continuous period of time. The resource configuration information may remain in the variable activated state after the first validity duration ends.

In an example, the first validity duration may be N DRX cycles or modification cycles, or N system frame numbers (SFNs)/hyper SFNs (H-SFNs), where N is a positive integer greater than or equal to 1.

The first validity duration is composed of at least two sub-validity durations that are discontinuous in the time domain. The resource configuration information may maintain in the variable deactivated state within the sub-validity durations, and maintain in the variable activated state outside the sub-validity durations.

In an embodiment, the first validity duration may be a duration outside the PTW window of eDRX that occurs periodically. The sub-validity duration is a duration spaced outside the PTW window The second validity duration may be a continuous duration in the time domain. The resource configuration information may remain in the variable activated state for a continuous period of time. The resource configuration information may remain in the variable deactivated state after the second validity duration ends.

In an example, the second validity duration may be N DRX cycles or modification cycles, or N SFNs/H-SFNs, where N is a positive integer greater than or equal to 1.

The second validity duration is composed of at least two sub-validity durations that are discontinuous in the time domain. The resource configuration information may maintain in the variable activated state within the sub-validity durations, and maintain in the variable deactivated state outside the sub-validity durations.

In an embodiment, the second validity duration may be a PTW window of eDRX that occurs periodically. The PTW window is the sub-validity duration.

In an embodiment, the method also includes:

sending first duration information indicating the first validity duration; or sending second duration information indicating the second validity duration.

The base station may send the first duration information to the UE, which is used to indicate the first validity duration. After receiving the first indication information, the UE may determine the first validity duration for which the resource configuration information remains in the deactivated state.

The base station may send the second duration information to the UE, which is used to indicate the second validity duration. After receiving the second indication information, the UE may determine the second validity duration for which the resource configuration information remains in the activated state.

Here, the first duration information may be the same as the second duration information, that is, the same information. Here, the first duration information may also be different from the second duration information.

The first validity duration may be the same as or different from the second validity duration.

In an embodiment, sending the first duration information indicating the first validity duration includes: sending the second indication information carrying the first duration information;

sending the second duration information indicating the second validity duration includes: sending the second indication information carrying the second duration information.

The first duration information may be carried in the second indication information. The UE may simultaneously determine that the resource configuration information is switched from a variable activated state to a variable deactivated state, and the resource configuration information remains in the deactivated state.

By carrying the first duration information in the second indication information, the amount of information carried in the second indication information is increased and the communication efficiency is thus improved.

The second duration information may be carried in the second indication information. The UE may simultaneously determine that the resource configuration information is switched from a variable deactivated state to a variable activated state, and the resource configuration information remains in the activated state.

By carrying the second duration information in the second indication information, the amount of information carried in the second indication information is increased and the communication efficiency is thus improved.

In an embodiment, sending the second indication information includes one of:

sending an RRC message carrying the second indication information; or sending a DCI message carrying the second indication information.

The base station informs the UE of the initial state of the resource configuration information of the reference signal, by carrying the second indication information in the RRC message or the DCI message. The existing RRC message or DCI message may be used to carry the second indication information, or a newly added RRC message or DCI message may be used to carry the second indication information.

In this way, the amount of information carried in the RRC message or the DCI message may be increased, and the transmission efficiency may be thus improved.

Figure 3:
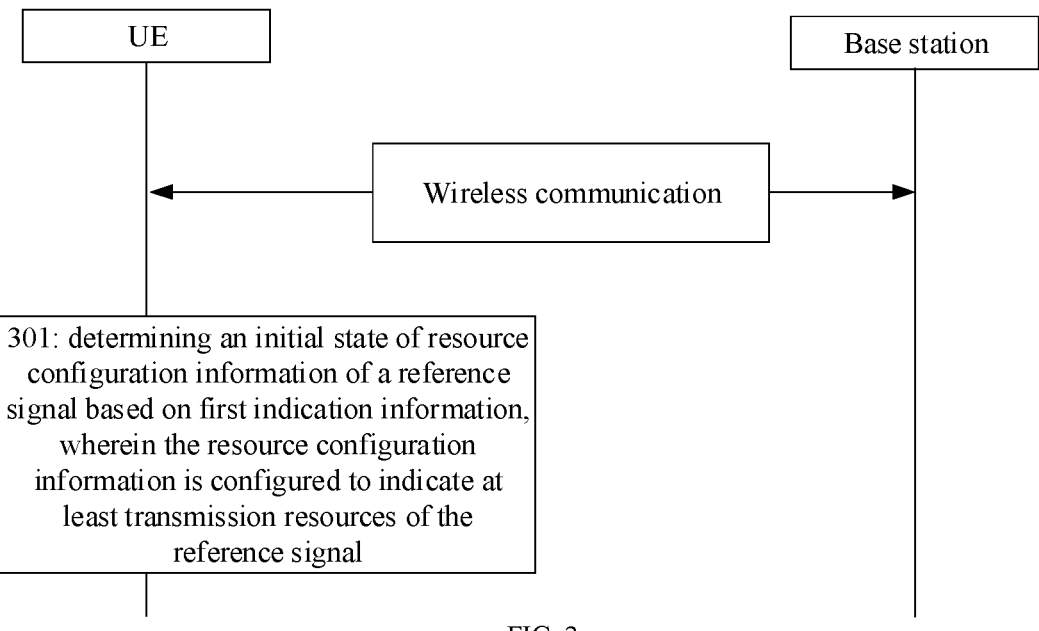
FIG. 3 is a flowchart illustrating a method for determining transmission resources applicable to a user equipment (UE) according to an embodiment.

As shown in FIG. 3, the embodiment provides a method for determining transmission resources, which may be applied to a user equipment (UE). The method includes:

At step 301, an initial state of resource configuration information of a reference signal is determined based on first indication information. The resource configuration information is configured to indicate at least transmission resources of the reference signal.

The UE may determine at least the transmission resources of the reference signal based on the resource configuration information. The UE may be in an inactive state or an idle state, etc.

The initial state of the resource configuration information may be an initial effective state set by the base station for the resource configuration information. The initial state may be a default state set by the base station for the resource configuration information, or a state of the resource configuration information set by the base station for the initially accessed UE, and the like.

Here, the reference signal may include but not limited to a signal for UE to perform time domain and/or frequency domain synchronization. The UE may receive the reference signal based on the transmission resources indicated by the resource configuration information, and achieve synchronization. The transmission resources indicated by the resource configuration information include but not limited to frequency domain resources, time domain resources and/or code domain resources.

The network side such as the base station may make initial state settings for the resource configuration information. For example, the resource configuration information may be set to be in an activated state or a deactivated state. The resource configuration information is in the activated state, which means that the transmission resources configured by the resource configuration information are reasonable, and the base station is actually sending a reference signal corresponding to the transmission resources. At this time, it is available to the UE, and the network side expects the UE to use. The resource configuration information is in the deactivated state, which means that the transmission resources configured by the resource configuration information may be unreasonable, or the transmission resources configured by the resource configuration information may be reasonable, but the network side does not use the transmission resources to send the reference signal. When the configuration information is in the deactivated state, the reference signal sent by using the transmission resources is available for the UE, and the network side expects the UE to use it.

In an embodiment, the first indication information is specified in a communication protocol.

In an embodiment, the method further includes: receiving the first indication information sent by the base station.

The base station may be configured with resource configuration information for indicating at least transmission resources of the reference signal. The base station may send the resource configuration information to the UE in the form of broadcast or unicast.

The base station may send the first indication information to the UE in the form of broadcast or unicast. After receiving the first indication information, the UE may determine the initial state of the resource configuration information.

In this way, the base station explicitly indicates the initial state of the resource configuration information through the first indication information, and the UE determines the initial state of the resource configuration information based on the first indication information, so that the base station and the UE reach a consensus on understanding the state of the resource configuration information, reducing a situation where the UE cannot accurately receive the reference signal due to the inconsistency between the base station and the UE in understanding the state of the resource configuration information.

In an embodiment, the first indication information sent by the receiving base station includes one of:

receiving an RRC message carrying the first indication information;

receiving a system message carrying the first indication information;

receiving a DCI message carrying the first indication information.

The base station informs the UE of the initial state of the resource configuration information of the reference signal by broadcasting a system message or a dedicated signaling that carries the first indication information, such as an RRC message or a DCI message.

In an example, the first indication information may be carried in an RRC release message.

In this way, the amount of information carried in the system message or the dedicated signaling, such as the RRC message or the DCI message, may be increased and the transmission efficiency may be thus improved.

In an embodiment, the reference signal includes at least one of: a channel state information reference signal (CSI-RS); a synchronization signal and physical broadcast channel block (SSB); or a tracking reference signal (TRS)

The initial state of resource configuration information may be the initial state of resource configuration information of CSI-RS, and/or TRS, and/or SSB.

The UE may determine the initial state of the resource configuration information of the CSI-RS, and/or the TRS, and/or the SSB based on the first indication information.

Then it is determined whether synchronization may be performed based on the CSI-RS, and/or TRS, and/or SSB.

In an example, in response to the initial state of the resource configuration information of the CSI-RS and/or TRS being in an activated state, the CSI-RS and/or TRS may be received on the transmission resources indicated by the resource configuration information, and the CSI-RS and/or TRS may be used for synchronization. In response to the initial state of the resource configuration information of the CSI-RS and/or TRS is in a deactivated state, the SSB may be used for synchronization.

In this way, on the one hand, a situation is reduced where due to the inconsistency between the base station and the UE in understanding the resource configuration information, the UE uses CSI-RS and/or TRS for synchronization when the resource configuration information is in the deactivated state, resulting in a decrease in the synchronization accuracy; on the other hand, a situation is reduced where due to the inconsistency between the base station and the UE in understanding the resource configuration information, the UE uses the SSB for synchronization when the resource configuration information is in the activated state, resulting in an increase in power consumption.

In an embodiment, the initial state of the resource configuration information includes one of: a fixed activated state, a variable activated state, or a variable deactivated state.

In response to the resource configuration information being in a fixed activated state, the state of the resource configuration information cannot be changed, i.e., being in a continuous activated state. The base station may not change the state of the resource configuration information, and may not send information associated with changing the state of the resource configuration information to indicate a change in the state of the resource configuration information.

In response to the resource configuration information being in a fixed activated state, the UE receives the reference signal based on the transmission resources indicated by the resource configuration information, and the UE may not continue to monitor the information associated with changing the state of the resource configuration information. It is always determined that the resource configuration information is in the activated state.

In response to the resource configuration information being in a variable activated state, the state of the resource configuration information may change. The base station may change the state of the resource configuration information, and send information associated with changing the state of the resource configuration information to indicate a change in the state of the resource configuration information. For example, the base station may adjust the resource configuration information to be in a variable deactivated state, and send information associated with changing the state of the resource configuration information to indicate that the state of the resource configuration information is changed to the deactivated state.

In response to the resource configuration information being in a variable deactivated state, the state of the resource configuration information may change. The base station may change the state of the resource configuration information, and send information associated with changing the state of the resource configuration information to indicate a change in the state of the resource configuration information. For example, the base station may adjust the resource configuration information to be in a variable activated state, and send information associated with changing the state of the resource configuration information to indicate that the state of the resource configuration information is changed to the activated state.

In response to the resource configuration information being in a variable activated state or a variable deactivated state, the UE determines whether to receive the reference signal based on the indication of the resource configuration information and the UE may continue to monitor the information associated with changing the state of the resource configuration information.

In this way, different initial states are indicated through the first indication information, thus improving the flexibility of indicating the resource configuration information.

In an embodiment, in response to the first indication information indicating that the resource configuration information is in the fixed activated state, the method further includes: in response to the UE switching from a first RRC state to a second RRC state, receiving reconfigured resource configuration information.

Here, reconfiguring the resource configuration information is that, the resource configuration information is activated while reconfiguring.

After sending the first indication information, the UE knows that the resource configuration information is in the fixed activated state. At this time, the base station may configure and activate resource configuration information at the same time. The first indication information may be carried in a downlink message and sent to the UE. For example, the first indication information may be carried in an RRC message and sent to the UE. In response to the first indication information indicating that the resource configuration information is in the fixed activated state, then the base station and the UE determine that the resource configuration information is in the fixed activated state, and the base station does not need to send other information to indicate a change in the state of the resource configuration information.

After receiving the first indication information indicating the fixed activated state, the UE may no longer monitor the second indication information, that is, no longer monitor indication information indicating a change in the state of the resource configuration information.

For UEs in different RRC states, the base station may configure different transmission resources of reference signals. Therefore, when the RRC state of the UE changes, the base station may reconfigure different transmission resources for the UE. Here, the first RRC state is different from the second RRC state. The first RRC state may be an RRC inactive state or an RRC idle state. The second RRC state may be an RRC idle state or an RRC inactive state.

In an embodiment, in response to the first indication information indicating that the resource configuration information is in the fixed activated state, the transmission resources of the reference signal indicated by the resource configuration information is periodic transmission resources.

In response to the first indication information indicating that the resource configuration information is in the fixed activated state, the transmission resources of the reference signal may be the periodic transmission resources. For example, the transmission resources of the reference signal may be transmission resources spaced by a predetermined number of DRX cycles. In an embodiment, the UE determines that the resource configuration information is in the activated state only within a paging time window (PTW window) in the scenario of configuring eDRX.

In an embodiment, in response to the first indication information indicating that the resource configuration information is in the variable activated state, the method further includes: receiving second indication information, in which the second indication information is configured to indicate the resource configuration information to switch from the variable activated state to the variable deactivated state; or in response to the first indication information indicating that the resource configuration information is in the variable deactivated state, the method further includes: receiving the second indication information, in which the second indication information is configured to indicate the resource configuration information to switch from the variable deactivated state to the variable activated state.

The second indication information may be a switch signal, indicating that the resource configuration information is switched between two or more states. For example, the second indication information may be a signal indicating that the resource configuration information is switched between a variable deactivated state and a variable activated state. If the UE currently determines that the resource configuration information is in a variable deactivated state and the second indication information is received, then the UE determines that the resource configuration information is in a variable activated state. If the UE currently determines that the resource configuration information is in a variable activated state and the second indication information is received, then the UE determines that the resource configuration information is in a variable deactivated state.

The second indication information may also directly indicate a state of the resource configuration information to be changed. For example, the second indication information may directly indicate to change the state of the resource configuration information to a variable deactivated state, or the second indication information may directly indicate to change the state of the resource configuration information to a variable activated state.

In this way, the state change of the resource configuration information is indicated by the second indication information, so that the base station may inform the UE when the state of the resource configuration information is changed, so that the understandings of the resource configuration information by the base station and the UE are consistent.

In response to the second indication information indicating the resource configuration information to switch from the variable activated state to the variable deactivated state, a duration for which the resource configuration information remains in the deactivated state may be an infinite time. The base station may reactivate the resource configuration information, and send to the UE again second indication information for indicating the resource configuration information to switch from the variable deactivated state to the variable activated state.

In response to the second indication information indicating the resource configuration information to switch from the variable deactivated state to the variable deactivated state, a duration for which the resource configuration information remains in the activated state may be an infinite time. The base station may deactivate the resource configuration information again, and send to the UE again second indication information for indicating the resource configuration information to switch from the variable activated state to the variable deactivated state.

The UE may determine that the resource configuration information is in the variable activated state or the variable deactivated state based on an indication of the second indication information.

In an embodiment, in response to the second indication information being configured to indicate the resource configuration information to switch from the variable activated state to the variable deactivated state, the method further includes: determining the resource configuration information is in the variable deactivated state within a first validity duration; or In response to the second indication information being configured to indicate the resource configuration information to switch from the variable deactivated state to the variable activated state, the method further includes: determining that the resource configuration information is in the variable activated state within a second validity duration.

In response to the second indication information indicating that the resource configuration information to switch from the variable activated state to the variable deactivated state, the duration for which the resource configuration information remains in the deactivated state may be the first validity duration. After the first validity duration ends, the base station may reactivate the resource configuration information.

The UE may determine that within the first validity duration, the resource configuration information is in the deactivated state, and outside the first validity duration, the resource configuration information is in the activated state. In response to the second indication information indicating the resource configuration information to switch from the variable deactivated state to the variable activated state, the duration for which the resource configuration information remains in the activated state may be the second validity duration. After the second validity duration ends, the base station may deactivate the resource configuration information again.

The UE may determine that within the second validity duration, the resource configuration information is in the activated state, and outside the second validity duration, the resource configuration information is in the deactivated state.

In an embodiment, the first validity duration or the second validity duration is pre-configured by a network side; or the first validity duration or the second validity duration is specified in a communication protocol.

Here, the first validity duration may be pre-configured by a core network or the like, or may be specified in a communication protocol.

Here, the second validity duration may be pre-configured by the core network or the like, or may be specified in a communication protocol.

In an embodiment, the first validity duration or the second validity duration is continuous in a time domain; or the first validity duration or the second validity duration includes at least two sub-validity durations that are discontinuous in a time domain.

The first validity duration may be a continuous duration in the time domain. The resource configuration information may remain in the variable deactivated state for a continuous period of time. The resource configuration information may remain in the variable activated state after the first validity duration ends.

In an example, the first validity duration may be N DRX cycles or modification cycles, or N system frame numbers (SFNs)/hyper SFNs (H-SFNs), where N is a positive integer greater than or equal to 1.

The first validity duration is composed of at least two sub-validity durations that are discontinuous in the time domain. The resource configuration information may maintain in the variable deactivated state within the sub-validity durations, and maintain in the variable activated state outside the sub-validity durations.

In an embodiment, the first validity duration may be a duration outside the PTW window of eDRX that occurs periodically. The sub-validity duration is a duration spaced outside the PTW window The second validity duration may be a continuous duration in the time domain. The resource configuration information may remain in the variable activated state for a continuous period of time. The resource configuration information may remain in the variable deactivated state after the second validity duration ends.

In an example, the second validity duration may be N DRX cycles or modification cycles, or N SFNs/H-SFNs, where N is a positive integer greater than or equal to 1.

The second validity duration is composed of at least two sub-validity durations that are discontinuous in the time domain. The resource configuration information may maintain in the variable activated state within the sub-validity durations, and maintain in the variable deactivated state outside the sub-validity durations.

In an embodiment, the second validity duration may be a PTW window of eDRX that occurs periodically. The PTW window is the sub-validity duration.

In an embodiment, the method also includes:
receiving first duration information; and determining the first validity duration based on the first duration information; or
receiving second duration information; and determining the second validity duration based on the second duration information.

The base station may send the first duration information to the UE, which is used to indicate the first validity duration. After receiving the first indication information, the UE may determine the first validity duration for which the resource configuration information remains in the deactivated state.

The base station may send the second duration information to the UE, which is used to indicate the second validity duration. After receiving the second indication information, the UE may determine the second validity duration for which the resource configuration information remains in the activated state.

Here, the first duration information may be the same as the second duration information, that is, the same information. Here, the first duration information may also be different from the second duration information.

The first validity duration may be the same as or different from the second validity duration.

In an embodiment, receiving the first duration information includes: receiving the second indication information carrying the first duration information;
receiving the second duration information includes:
receiving the second indication information carrying the second duration information.

The first duration information may be carried in the second indication information. The UE may simultaneously determine that the resource configuration information is switched from a variable activated state to a variable deactivated state, and the resource configuration information remains in the deactivated state.

By carrying the first duration information in the second indication information, the amount of information carried in the second indication information is increased and the communication efficiency is thus improved.

The second duration information may be carried in the second indication information. The UE may simultaneously determine that the resource configuration information is switched from a variable deactivated state to a variable activated state, and the resource configuration information remains in the activated state.

By carrying the second duration information in the second indication information, the amount of information carried in the second indication information is increased and the communication efficiency is thus improved.

In an embodiment, receiving the second indication information includes one of:
receiving an RRC message carrying the second indication information; or
receiving a DCI message carrying the second indication information.

The base station informs the UE of the initial state of the resource configuration information of the reference signal, by carrying the second indication information in the RRC message or the DCI message. The existing RRC message or DCI message may be used to carry the second indication information, or a newly added RRC message or DCI message may be used to carry the second indication information.

In this way, the amount of information carried in the RRC message or the DCI message may be increased, and the transmission efficiency may be thus improved.

A specific example is provided below in combination with any of the above-mentioned embodiments:

The network side indicates an initial state of configuration resource, or agrees with the UE on the initial state of the configuration resource in advance through a protocol.

As an embodiment, the configuration resource is configuration information of a specific reference signal;

As an embodiment, the configuration resource (i.e., the configuration information of the specific reference signal) may be notified to a UE in a system message or an RRC message (such as an RRC release message);

As an embodiment, the initial state of the configuration resource is expressed as an activated state or a deactivated state of the resource:

Activated state: the resource configured by the configuration information is reasonable, and the network is actually sending the specific reference signal corresponding to the resource; at this time, it is available to the UE and the network expects the UE to use it;

Deactivated state: the resource configured by the configuration information is unreasonable, or the resource configuration is reasonable but the network does not actually send the specific reference signal corresponding to the resource; at this time, it is unavailable for the UE and the network does not expect the UE to use.

The initial state includes any of the following:
a) State 1: a fixed deactivated state, the state of resources in the fixed deactivated state cannot be changed by an activation indication/deactivation indication.
b) State 2: a variable activated state that may be changed by a subsequent deactivation indication/activation indication.
c) State 3: a variable deactivated state that may be changed by a subsequent activation indication/deactivation indication.

The specific reference signal includes at least one of: CSI-RS; SSB; or TRS.

For the State 1, the UE no longer monitors the activation indication or deactivation indication of the resources.

Further, for the State 1, an indication bit for activation or deactivation of the resources may be reserved for subsequent use.

Further, for the State 1, the resource type may be limited to periodic resources.

Further, for the State 1, the configuration may be deleted by the network.

Further, for the State 1, when the UE changes its own state (for example, the UE switches from the inactive state to the idle state, the configuration resource may be reconfigured;

For the State 2, after receiving the resource configuration from the network side, the UE continues to monitor the deactivation indication, and judges whether the resource is available according to the deactivation indication. For example, the activation means the resource is available, and the UE monitors the resource; the deactivation means the resource is unavailable, and the UE does not monitor the resource.

In the Case 1, the resource is configured in the deactivated state for a specific duration under the deactivation indication. After the specific duration expires or is outside the time window, the resource will be back to the activated state;

The effective time may be time pre-configured by the network or agreed in a protocol;

The effective time may be carried in the deactivation indication at the same time;

The effective time may be N DRX cycles, or modification cycles;

The effective time may be N SFNs/H-SFNs;

Further, the validity duration may be a duration such as outside the PTW window of eDRX that occurs periodically, that is, the inactive UE only activates the resource within the PTW window in the idle eDRX scenario, In the Case 2, the validity duration is infinite until the next activation indication is received.

For the State 3, after the UE receives the resource configuration from the network side, the UE continues to monitor the activation indication, and judges whether the resource is available according to the activation or deactivation indication. For example, if the activation means the resource is available, the UE monitors the resource; if the deactivation means the resource is unavailable, UE does not monitor the resource.

In the Case 1, the resource is configured in the activated state for a specific duration under the activation indication. After the specific duration expires or is outside the time window, the resource will be back to the deactivated state;

The effective time may be time pre-configured by the network;

The effective time may be carried in the activation indication at the same time;

The effective time may be N DRX cycles, or modification cycles;

The effective time may be N SFNs/H-SFNs;

Further, the validity duration may be a duration such as the PTW window of eDRX that appears periodically;

In the Case 2, the validity duration is infinite until the next deactivation indication is received.

The deactivation/activation indication may be an explicit indication, such as an RRC or DCI message;

As an embodiment, the RRC message is a system message/paging message

As an embodiment, the DCI message is a paging DCI/power-saving signal;

Furthermore, for the UE in an inactive state, when the UE changes its own state (for example, the UE switches from an inactive state to an idle state), the indication may be carried in the RRC release message.

When the network side indicates the initial state of the configuration resource, the UE may be notified through a system message or RRC signaling;

The RRC signaling is an RRC release message.

Figure 4:
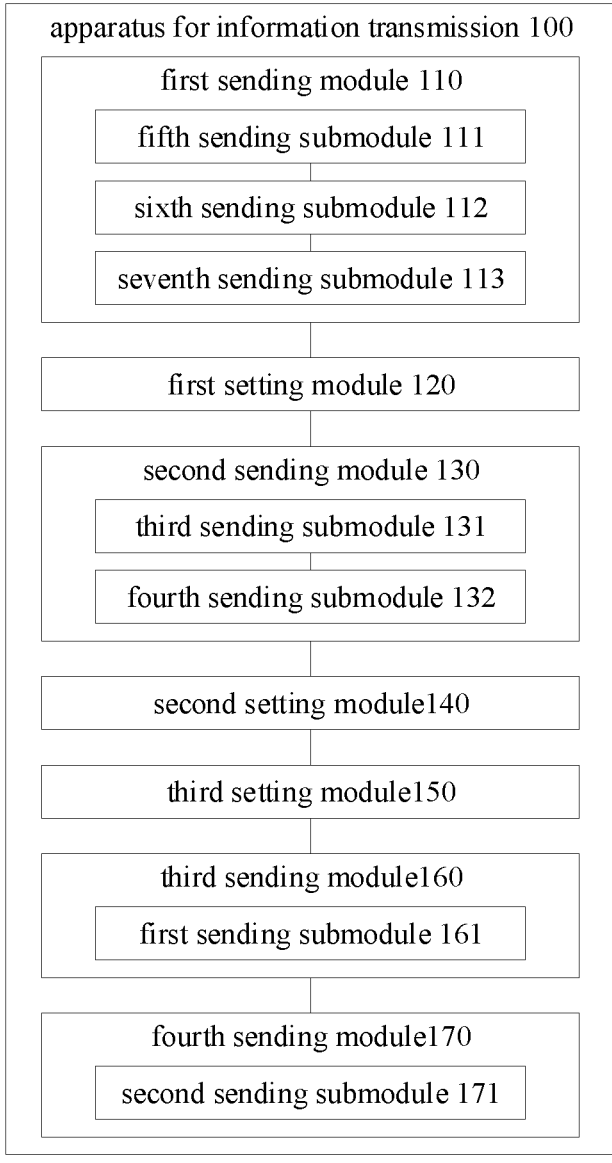
FIG. 4 is a block diagram illustrating an apparatus for information transmission according to an embodiment.

The embodiments of the disclosure also provide an apparatus for information transmission, applied to a base station. As shown in FIG. 4, the apparatus 100 for information transmission includes a first sending module 110.

The first sending module 110 is configured to send first indication information. The first indication information is configured to indicate an initial state of resource configuration information of a reference signal, and the resource configuration information is configured to indicate at least transmission resources of the reference signal.

In an embodiment, the initial state of the resource configuration information includes one of: a fixed activated state, a variable activated state, or a variable deactivated state.

In an embodiment, in response to the first indication information indicating that the resource configuration information is in the fixed activated state, the apparatus 100 further includes:

a first setting module 120, configured to reconfigure the resource configuration information in response to a user equipment (UE) switching from a first radio resource control (RRC) state to a second RRC state.

In an embodiment, in response to the first indication information indicating that the resource configuration information is in the fixed activated state, the transmission resources of the reference signal indicated by the resource configuration information are periodic transmission resources.

In an embodiment, the apparatus 100 further includes a second sending module 130, configured to:

in response to the first indication information indicating that the resource configuration information is in the variable activated state, send second indication information, in which the second indication information is configured to indicate the resource configuration information to switch from the variable activated state to the variable deactivated state; or in response to the first indication information indicating that the resource configuration information is in the variable deactivated state, send second indication information, in which the second indication information is configured to indicate the resource configuration information to switch from the variable deactivated state to the variable activated state.

In an embodiment, in response to the second indication information being configured to indicate the resource configuration information to switch from the variable activated state to the variable deactivated state, the apparatus 100 further includes: a second setting module 140, configured to maintain the resource configuration information in the variable deactivated state within a first validity duration; or in response to the second indication information being configured to indicate the resource configuration information to switch from the variable deactivated state to the variable activated state, the apparatus 100 further includes: a third setting module 150, configured to maintain the resource configuration information in the variable activated state within a second validity duration.

In an embodiment, the first validity duration or the second validity duration is pre-configured by a network side; or the first validity duration or the second validity duration is specified in a communication protocol.

In an embodiment, the first validity duration or the second validity duration is continuous in a time domain; or the first validity duration or the second validity duration includes at least two sub-validity durations that are discontinuous in a time domain.

In an embodiment, the apparatus 100 further includes:

a third sending module 160, configured to send first duration information indicating the first validity duration; or a fourth sending module 170, configured to send second duration information indicating the second validity duration.

In an embodiment, the third sending module 160 includes a first sending submodule 161, configured to send the second indication information carrying the first duration information; and the fourth sending module 170 includes a second sending submodule 171, configured to send the second indication information carrying the second duration information.

In an embodiment, the second sending module 130 includes one of:

a third sending module submodule 131, configured to send a radio resource control (RRC) message carrying the second indication information; or a fourth sending module submodule 132, configured to send a downlink control information (DCI) message carrying the second indication information.

In an embodiment, the reference signal includes at least one of: a channel state information reference signal (CSI-RS); a synchronization signal and physical broadcast channel block (SSB); or a tracking reference signal (TRS).

In an embodiment, the first sending module 110 includes:

a fifth sending module submodule 111, configured to send a radio resource control (RRC) message carrying the first indication information;

a sixth sending module submodule 112, configured to send a system message carrying the first indication information; or a seventh sending module submodule 113, configured to send a downlink control information (DCI) message carrying the first indication information.

Figure 5:
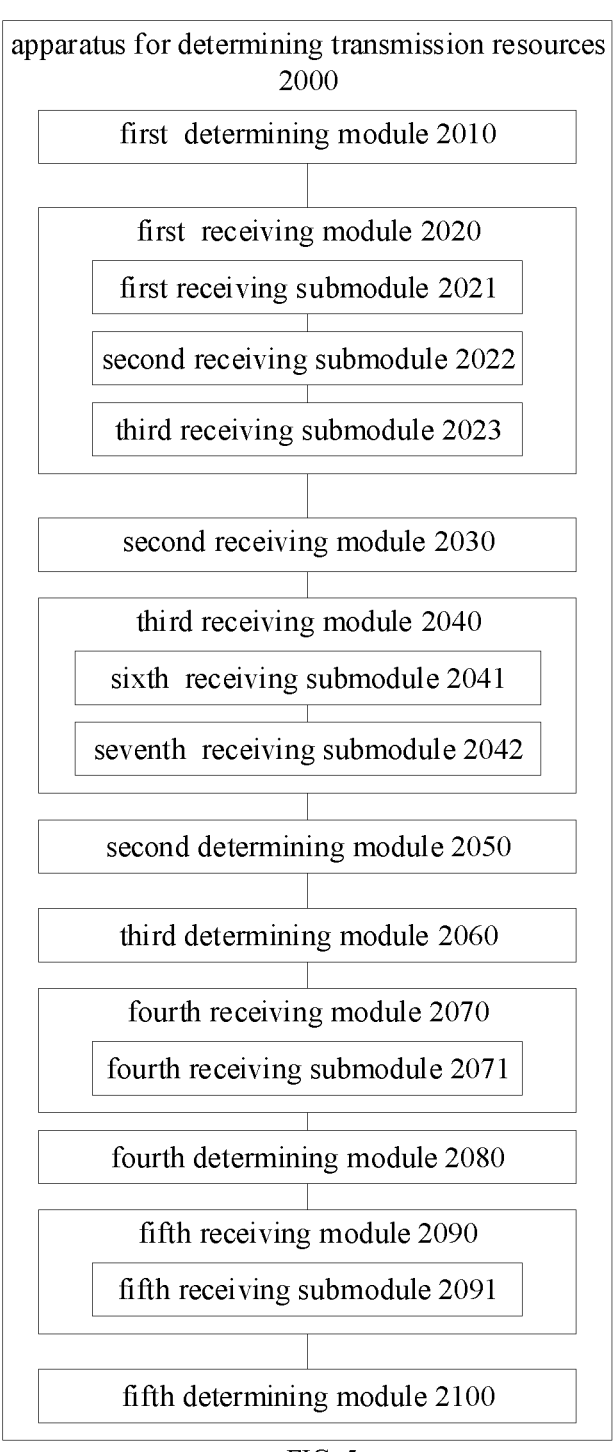
FIG. 5 is a block diagram illustrating another apparatus for determining transmission resources according to an embodiment.

The embodiments of the disclosure also provides an apparatus for determining transmission resources, applied to a UE. As shown in FIG. 5, the apparatus 2000 for determining transmission resources includes a first determining module 2010.

The first determining module 2010 is configured to determine an initial state of resource configuration information of a reference signal based on first indication information, in which the resource configuration information is configured to indicate at least transmission resources of the reference signal.

In an embodiment, the apparatus 2000 further includes: a first receiving module 2020, configured to receive the first indication information sent by a base station.

In an embodiment, the first receiving module 2020 comprises one of:

a first receiving submodule 2021, configured to receive a radio resource includes (RRC) message carrying the first indication information;

a second receiving submodule 2022, configured to receive a system message carrying the first indication information; or a third receiving submodule 2023, configured to receive a downlink control information (DCI) message carrying the first indication information.

In an embodiment, the first indication information is specified in a communication protocol.

In an embodiment, the initial state of the resource configuration information includes one of: a fixed activated state, a variable activated state, or a variable deactivated state.

In an embodiment, in response to the first indication information indicating that the resource configuration information is in the fixed activated state, the apparatus 2000 further includes:

a second receiving module 2030, configured to in response to the UE switching from a first radio resource control (RRC) state to a second RRC state, receive reconfigured resource configuration information.

In an embodiment, in response to the first indication information indicating that the resource configuration information is in the fixed activated state, the transmission resources of the reference signal indicated by the resource configuration information are periodic transmission resources.

In an embodiment, the apparatus 2000 further includes a third receiving module 2040, configured to:

in response to the first indication information indicating that the resource configuration information is in the variable activated state, receiving second indication information, in which the second indication information is configured to indicate the resource configuration information to switch from the variable activated state to the variable deactivated state; or in response to the first indication information indicating that the resource configuration information is in the variable deactivated state, receiving second indication information, in which the second indication information is configured to indicate the resource configuration information to switch from the variable deactivated state to the variable activated state.

In an embodiment, in response to the second indication information being configured to indicate the resource configuration information to switch from the variable activated state to the variable deactivated state, the apparatus 2000 further includes: a second determining module 2050, configured to determine the resource configuration information is in the variable deactivated state within a first validity duration; or in response to the second indication information being configured to indicate the resource configuration information to switch from the variable deactivated state to the variable activated state, the apparatus 2000 further includes: a third determining module 2060, configured to determine the resource configuration information is in the variable activated state within a second validity duration.

In an embodiment, the first validity duration or the second validity duration is pre-configured by a network side; or the first validity duration or the second validity duration is specified in a communication protocol.

In an embodiment, the first validity duration or the second validity duration is continuous in a time domain; or the first validity duration or the second validity duration includes at least two sub-validity durations that are discontinuous in a time domain.

In an embodiment, the apparatus 2000 further includes:

a fourth receiving module 2070, configured to receive first duration information; and a fourth determining module 2080, configured to determine the first validity duration based on the first duration information; or a fifth receiving module 2090, configured to receive second duration information; and a fifth determining module 2100, configured to determine the second validity duration based on the second duration information.

In an embodiment, the fourth receiving module 2070 includes: a fourth receiving submodule 2071, configured to receive the second indication information carrying the first duration information; and the fifth receiving module 2090 includes: a fifth receiving submodule 2091, configured to receive the second duration information includes: receiving the second indication information carrying the second duration information.

In an embodiment, the third receiving module 2040 includes one of:

a sixth receiving submodule 2041, configured to receive a radio resource control (RRC) message carrying the second indication information; or a seventh receiving submodule 2042, configured to receive a downlink control information (DCI) message carrying the second indication information.

In an embodiment, the reference signal includes at least one of: a channel state information reference signal (CSI-RS); a synchronization signal and physical broadcast channel block (SSB); or a tracking reference signal (TRS).

In an embodiment, the first sending module 110, the first setting module 120, the second sending module 130, the second setting module 140, the third setting module 150, the third sending module 160, the fourth sending module 170, the first determining module 2010, the first receiving module 2020, the second receiving module 2030, the third receiving module 2040, the second determining module 2050, the fourth receiving module 2070, the third determining module 2060, the fourth determining module 2080, the fifth receiving module 2090 and the fifth determining module 2100, etc. may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors, or other electronic components to perform the aforementioned method.

Figure 6:
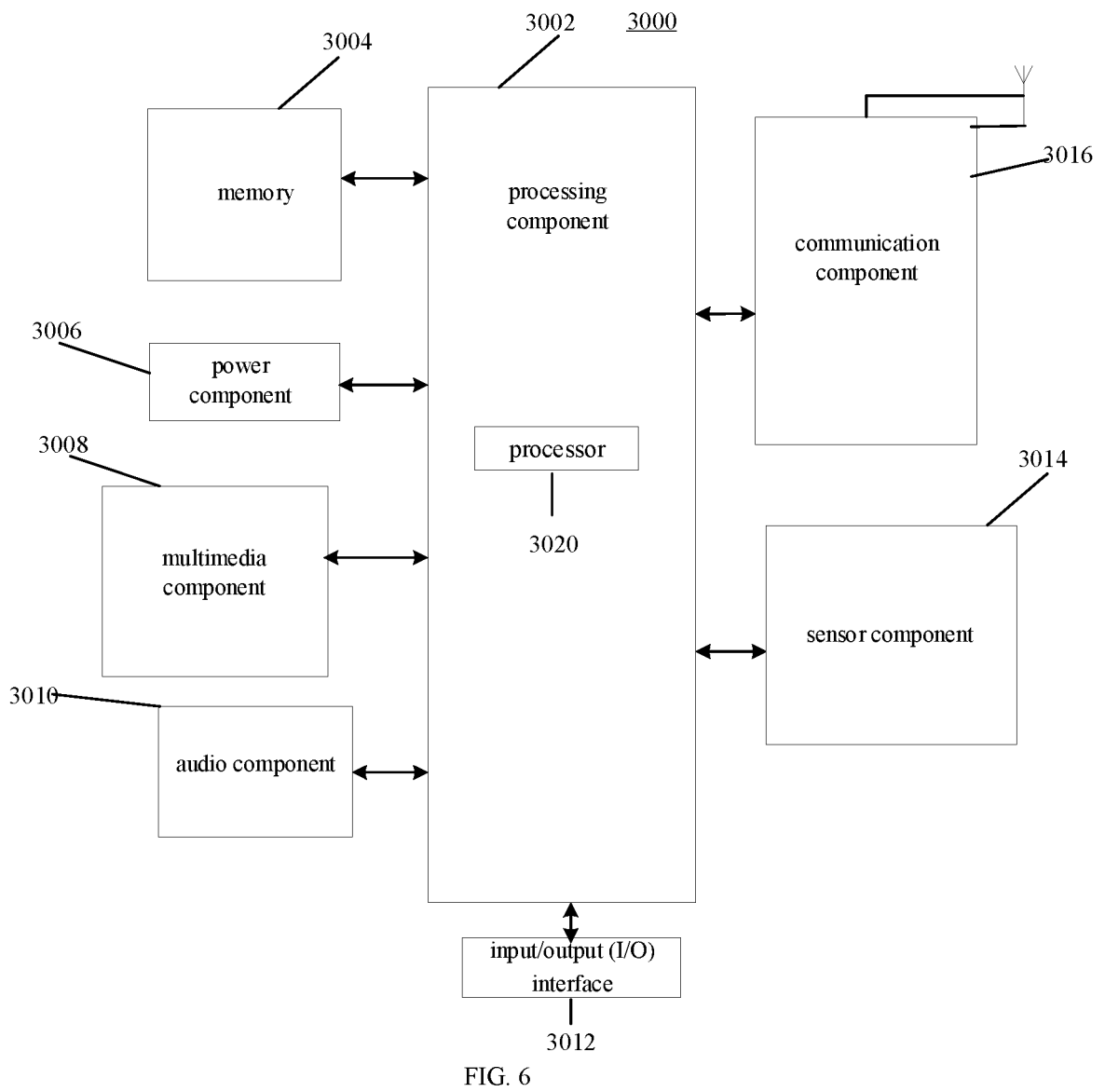
FIG. 6 is a block diagram illustrating a device for information transmission or for determining transmission resources according to an embodiment.

FIG. 6 is a block diagram illustrating a device 3000 for information transmission or for determining transmission resources according to an embodiment. For example, the device 3000 may be a mobile phone, a computer, a digital broadcast terminal, a messaging device, a game console, a tablet device, a medical device, a fitness device, a personal digital assistant, and the like.

Referring to FIG. 6, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 generally controls overall operations of the device 3000, such as those associated with display, telephone calls, data communications, camera operations, and recording operations. The processing component 3002 may include one or more processors 3020 to execute instructions to perform all or some of the steps of the methods described above. Moreover, the processing component 3002 may include one or more modules that facilitate interactions between the processing component 3002 and other components. For example, the processing component 3002 may include a multimedia module to facilitate interactions between the multimedia component 3008 and the processing component 3002.

The memory 3004 is configured to store various types of data to support operations of the device 3000. Examples of such data include instructions for any application or method operating on the device 3000, contact data, phonebook data, messages, pictures, videos, and the like. The memory 3004 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) that is configured to receive external audio signals when the device 3000 is in an operating mode, such as a call mode, a recording mode, and a voice recognition mode. The received audio signal may be further stored in the memory 3004 or transmitted via the communication component 3016. In some embodiments, the audio component 3010 also includes a speaker for outputting audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide state assessments of various aspects of the device 3000. For instance, the sensor component 3014 may detect an open/closed state of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a complementary metal oxide semiconductor (CMOS) or a charge-coupled device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as Wi-Fi™, 2G, or 3G, or their combination. In an embodiment, the communication component 3016 receives a broadcast signal or broadcast associated information from an external broadcast management system via a broadcast channel. In an embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In some embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In some embodiments, there is also provided a non-transitory computer readable storage medium including instructions, such as included in the memory 3004, executable by the processor 3020 in the device 3000, for performing the above method. For example, the non-transitory computer readable storage medium may be a ROM, a random access memory (RAM), a CD-ROM, a magnetic tape, a floppy disc, an optical data storage device, and the like.

According to the method and apparatus for information transmission, communication device, and storage medium in the embodiments of the present disclosure, the base station sends first indication information, in which the first indication information is configured to indicate the initial state of the resource configuration information of the reference signal, and the resource configuration information is configured to indicate at least the transmission resources of the reference signal. In this way, the base station explicitly indicates the initial state of the resource configuration information through the first indication information, and the UE determines the initial state of the resource configuration information based on the first indication information, so that the base station and the UE reach a consensus on understanding the state of the resource configuration information, avoiding a situation where the UE cannot accurately receive the reference signal due to the inconsistency between the base station and the UE in understanding the state of the resource configuration information.

Those skilled in the art will be aware of other implementations of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope and spirit of the disclosure are indicated in the following claims.

It should be understood that the disclosure is not limited to the precise structures described above and illustrated in the accompanying drawings, and that various modifications and changes may be made without departing from its scope. The scope of the disclosure is limited only by the appended claims.

The invention claimed is:

1. A method for information transmission, performed by a base station, the method comprising:

sending a downlink control information (DCI) message carrying indication information, wherein the indication information is configured to indicate to switch a state of resource configuration information of a reference signal from an unavailable state to an available state, in which the resource configuration information indicates at least transmission resources of the reference signal;

in response to the indication information being configured to indicate the resource configuration information to switch from the unavailable state to the available state, maintaining the resource configuration information in the available state within a validity duration; and sending duration information carrying the validity duration, wherein the validity duration is N discontinuous reception (DRX) cycles.

2. The method of claim 1, wherein the validity duration is pre-configured by a network device; or the validity duration is specified in a communication protocol.

3. The method of claim 1, wherein the validity duration is continuous in a time domain; or the validity duration comprises at least two sub-validity durations that are discontinuous in a time domain.

4. The method of claim 1, wherein the reference signal comprises at least one of: a channel state information reference signal (CSI-RS); a synchronization signal and physical broadcast channel block (SSB); or a tracking reference signal (TRS).

5. A base station, comprising: a processor, and a memory storing instructions executable by the processor; wherein when the instructions are executed by the processor, the method according to claim 1 is implemented.

6. The method of claim 1, wherein the DCI message is a paging DCI or a power-saving signal.

7. A method for information transmission, performed by a user equipment (UE), the method comprising:

receiving a downlink control information (DCI) message carrying indication information, wherein the indication information is configured to indicate to switch a state of resource configuration information of a reference signal from an unavailable state to an available state, in which the resource configuration information indicates at least transmission resources of the reference signal;

in response to the indication information being configured to indicate the resource configuration information to switch from the unavailable state to the available state, determining the resource configuration information is in the available state within a validity duration;

receiving duration information carrying the validity duration, wherein the validity duration is N discontinuous reception (DRX) cycles.

8. The method of claim 7, wherein the validity duration is pre-configured by a network device; or the validity duration is specified in a communication protocol.

9. The method of claim 7, wherein the validity duration is continuous in a time domain; or the validity duration comprises at least two sub-validity durations that are discontinuous in a time domain.

10. The method of claim 7, wherein the reference signal comprises at least one of: a channel state information reference signal (CSI-RS); a synchronization signal and physical broadcast channel block (SSB); or a tracking reference signal (TRS).

11. The method of claim 7, wherein the DCI message is a paging DCI or a power-saving signal.

12. A user equipment (UE), comprising: a processor, and a memory storing instructions executable by the processor;

wherein when the instructions are executed by the processor, the processor is configured to:

receive a downlink control information (DCI) message carrying indication information, wherein the second indication information is configured to indicate to switch a state of resource configuration information of a reference signal from an unavailable state to an available state, in which the resource configuration information indicates at least transmission resources of the reference signal;

in response to the indication information being configured to indicate the resource configuration information to switch from the unavailable state to the available state, determine the resource configuration information is in the available state within a validity duration;

receive duration information carrying the validity duration, wherein the validity duration is N discontinuous reception (DRX) cycles.

13. The UE of claim 12, wherein the DCI message is a paging DCI or a power-saving signal.

* * * * *